US012748912B2

(12) United States Patent
Dhindsa et al.

(10) Patent No.: US 12,748,912 B2
(45) Date of Patent: *Sep. 29, 2026

(54) GENERATING INTERDEPENDENT DOCUMENT CHUNKS USING LARGE LANGUAGE MODELS

(71) Applicant: Insight Direct USA, Inc., Chandler, AZ (US)

(72) Inventors: Dilbagh Singh Dhindsa, Pune (IN); Catherine Jean Snell, Durham, NC (US)

(73) Assignee: Insight Direct USA, Inc., Chandler, AZ (US)

( * ) Notice: Subject to any disclaimer, the term of this patent is extended or adjusted under 35 U.S.C. 154(b) by 237 days.

This patent is subject to a terminal disclaimer.

(21) Appl. No.: 18/657,022

(22) Filed: May 7, 2024

(65) Prior Publication Data

US 2025/0348653 A1 Nov. 13, 2025

(51) Int. Cl.

*G06F 40/40* (2020.01)
*G06F 40/103* (2020.01)
*G06F 40/289* (2020.01)
*G06Q 10/10* (2023.01)

(52) U.S. Cl.

CPC .......... *G06F 40/103* (2020.01); *G06F 40/289* (2020.01); *G06F 40/40* (2020.01); *G06Q 10/103* (2013.01)

(58) Field of Classification Search

CPC ...... G06F 40/103; G06F 40/40; G06F 40/289; G06Q 10/103

See application file for complete search history.

(56) References Cited

U.S. PATENT DOCUMENTS

| | | | |
|---|---|---|---|
| 5,963,940 | A | 10/1999 | Liddy et al. |
| 6,901,399 | B1 | 5/2005 | Corston et al. |
| 7,346,490 | B2 | 3/2008 | Fass et al. |
| 8,527,534 | B2 | 9/2013 | Wang et al. |
| 8,645,124 | B2 | 2/2014 | Karov Zangvil |
| 9,892,111 | B2 | 2/2018 | Danielyan et al. |
| 10,037,317 | B1 | 7/2018 | Kaeser et al. |
| 10,713,291 | B2 | 7/2020 | Tata et al. |

(Continued)

FOREIGN PATENT DOCUMENTS

| | | | |
|---|---|---|---|
| EP | 0475964 | B1 | 5/1997 |
| WO | 2021055102 | A1 | 3/2021 |

*Primary Examiner* — Mahelet Shiberou

(74) *Attorney, Agent, or Firm* — Kinney & Lange, P.A.

(57) ABSTRACT

A method of generating a document having multiple chunks of text that collectively form the document is disclosed herein that can include determining a first chunk of text to generate dependent upon topical information relevant to the document that is to be created and retrieving at least one example first chunk of text dependent upon a desired purpose of the first chunk and upon the topical information. The method can further include generating the first chunk of text by a first large language model via a first request. The method can also include determining a second chunk of text to generate dependent upon the topical information and retrieving at least one example second chunk of text dependent upon a desired purpose of the second chunk and upon the topical information. Additional steps can include generating the second chunk of text by the first large language model via a second request.

20 Claims, 3 Drawing Sheets

(56) References Cited

U.S. PATENT DOCUMENTS

| | | | |
|---|---|---|---|
| 10,733,366 B2 | 8/2020 | Yawn et al. | |
| 11,023,503 B2 | 6/2021 | Satterfield et al. | |
| 11,334,722 B2 | 5/2022 | Ng et al. | |
| 11,361,151 B1 | 6/2022 | Guberman et al. | |
| 11,734,517 B1 | 8/2023 | Abi-Akl et al. | |
| 11,748,577 B1 | 9/2023 | Aberle | |
| 2006/0155530 A1 | 7/2006 | Altevogt et al. | |
| 2016/0078102 A1* | 3/2016 | Crouch | G06F 16/313<br>707/722 |
| 2019/0347284 A1 | 11/2019 | Roman et al. | |
| 2020/0327151 A1 | 10/2020 | Coquard et al. | |
| 2023/0315981 A1 | 10/2023 | Belhe et al. | |
| 2024/0273306 A1 | 8/2024 | Somaiya et al. | |
| 2024/0419912 A1 | 12/2024 | Somech et al. | |
| 2024/0428005 A1* | 12/2024 | Abraham | G06F 16/38 |
| 2025/0061279 A1 | 2/2025 | Delevie | |
| 2025/0156639 A1* | 5/2025 | Sinha | G06V 30/416 |
| 2025/0211549 A1* | 6/2025 | Arunachalam | H04L 51/02 |

* cited by examiner

GENERATING INTERDEPENDENT DOCUMENT CHUNKS USING LARGE LANGUAGE MODELS

FIELD OF THE INVENTION

The disclosure relates generally to the creation of documents, such as statements of work (hereinafter, "SOW" or "SOWs"), and, in particular, to the generation of various chunks of documents using a large language model and the assembling and evaluation of those chunks to form a unified and consistent document.

BACKGROUND

The creation of textual documents can require knowledge and experience to ensure that the document includes all relevant information organized in a coherent and easy to understand manner. Additionally, as is the case with a contract or other document intending to state the relationship between two parties (such as a statement of work), the document should have specific sections defining the goals and obligations of the involved parties while also avoiding any confusing or impermissible terms and/or phrases. Thus, the creation of such documents can be tedious and time consuming, resulting in errors when performed without the proper knowledge, experience, and information.

SUMMARY

A method of generating a document having multiple chunks of text that collectively form at least a portion of the document is disclosed herein that can include determining a first chunk of the multiple chunks of text to generate dependent upon topical information relevant to the document that is to be created and retrieving, from an index, at least one example first chunk of text with the at least one example first chunk of text being dependent upon a desired purpose of the first chunk and upon the topical information. The method can further include generating the first chunk of text by a first large language model via a first request that includes a prompt that states the desired purpose of the first chunk of text to be generated, a context that provides first information dependent upon the topical information, and the at least one example first chunk of text. The method can also include determining a second chunk of the multiple chunks of text to generate dependent upon the topical information and retrieving, from the index, at least one example second chunk of text with the at least one example second chunk of text being dependent upon a desired purpose of the second chunk and upon the topical information. Additional steps can include generating the second chunk of text by the first large language model via a second request that includes a prompt that states the desired purpose of the second chunk of text to be generated, a context that provides second information dependent upon the topical information, the at least one example second chunk of text, and the first chunk of text with the second chunk of text being dependent upon the first chunk of text previously generated by the first large language model and assembling the first chunk of text and the second chunk of text to form at least a portion of the document such that the first chunk and the second chunk are consistent in content.

Figure 1:
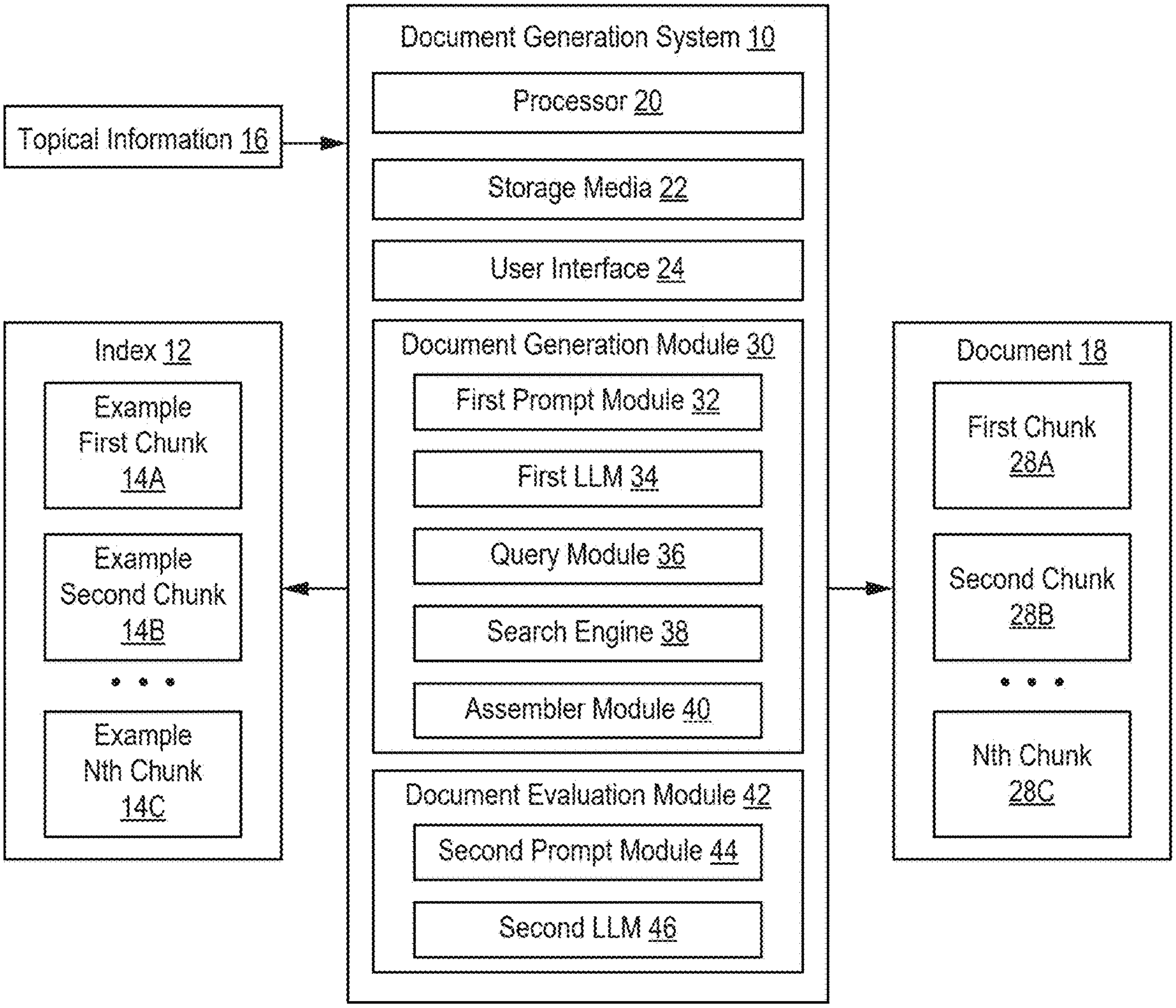
FIG. 1 is a block schematic diagram of an example document generation system.

While the above-identified figures set forth one or more examples of the present disclosure, other examples/embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and examples of the present invention may include features and components not specifically shown in the drawings.

DETAILED DESCRIPTION

A system and related processes are disclosed herein for generating a document, such as a statement of work (hereinafter, "SOW" or "SOWs"), having multiple chunks of text using a large language model and/or evaluating the chunks of text for hallucinations and/or compliance using the same or a different large language model and/or a similarity/cognitive search engine. In one example, the SOW is for development of a computer software program. The document can be generated dependent upon topical information provided by a user and/or the desired purpose of the document and/or of each chunk of the multiple chunks of text. The system and related processes include retrieving one or multiple example chunks of text relevant to a to-be-generated chunk from an index that includes multiple example chunks of text. At least one of those relevant example chunks can be provided to a large language model (hereinafter, "LLM") along with other information. The LLM can be configured to generate/determine the chunk of text dependent upon the topical information that accomplishes the desired purpose of the chunk as set out in the request provided to the LLM. The system and processes can be repeated multiple times for each chunk to generate a complete document having multiple chunks accomplishing differing purposes and having differing contents.

The system and processes can include an assembler module and/or other modules for assembling the chunks into a continuous document in an organized, coherent, and easy to understand manner. Additionally, the system and processes can include a prompt module that formulates the request that includes the prompt that states the desired purpose of the chunk of text to be generated, a context that provides information dependent upon the topical information, and/or the example chunks of text relevant to the chunk of text to be generated.

The system and processes can include evaluating each chunk (generated via the use of the LLM) for one or multiple hallucinations. Some LLMs can generate hallucinations, which is data/information that is not grounded in fact and/or is not responsive to the request. The system and processes can perform such an evaluation by providing the generated chunk, along with prompts, context, and/or topical information (and/or information dependent upon the topical information) to another LLM that asks the other LLM to evaluate the chunk of text for hallucinations. If the evaluation by the other LLM reveals/determines that the chunk of text includes at least one hallucination, the system and/or processes can include discarding the chunk, saving/cataloging the chunk, and/or performing other actions (such as initiating an alert that the chunk of text includes at least one hallucination). Additionally, the evaluation of the generated chunk for hallucinations can include formulating a hallucination score and/or providing that hallucination score to a user to inform the user as to the likelihood that the generated chunk includes at least one hallucination, the amount of generated chunk that is and/or includes a hallucination, and/or other information regarding the generated chunk and a potential hallucination therein.

Further, the system and processes can include generating chunks that are dependent and/or interdependent upon other, previously generated chunks (e.g., dependent upon newly generated chunks). For example, the system and processes can include generating a first chunk of text that includes (e.g., accomplishes the desired purpose) a scope of the project, and subsequent chunks of text for the same document as the scope of the project can be dependent upon the scope of the project chunk that has previously been generated. For example, the chunks dependent upon the scope of the project can be, for example, the project duration, assumptions, client responsibilities, deliverables, service description, and/or party roles. The system and/or processes can include determining the first, independent chunks of text to be generated (known as first level chunks), then determining the second level chunks of text that depend from the first level chunks, the third level chunks of text that depend from the second level chunks of text, and so on and so forth. This sequence in which the system and/or processes generate multiple levels of chunks of text can be very complex. The features, functions, capabilities, and/or advantages of the disclosed document generation system and processes are realized by reviewing the below disclosure.

FIG. 1 is a block schematic diagram of an example document generation system 10 (hereinafter referred to as "system 10"). System 10 can communicate with index 12 to access, receive, and/or otherwise use one or multiple example first chunks 14A, one or multiple second chunks 14B, and/or one or multiple example Nth chunks 14C (e.g., any number of example chunks collectively described herein as "example chunks 14"). Additionally, system 10 can access, receive, and/or otherwise use topical information 16 from sources external to system 10. System 10 can generate document 18 and/or provide document 18 to any location within and/or external to system 10, such as to a user. Document 18 can include first chunk 28A, second chunk 28B, and/or Nth chunk 28C (e.g., any number of chunks collectively described herein as "chunks 28"). Document 18 can include other information not expressly disclosed herein and/or can be generated in any physical and/or digital format, such as an electronic text document (e.g., a Word document), a PDF, and/or another format. System 10 can include, among other components not expressly disclosed herein, processor 20, storage media 22, and user interface 24 (which can be used to input topical information 16).

Further, system 10 can include document generation module 30, which can have first prompt module 32, first LLM 34, query module 36, search engine 38, and/or assembler module 40. System 10 can also include document evaluation module 42, which can have second prompt module 44 and/or second LLM 46. In other configurations, first LLM 34, search engine 38, and/or second LLM 46 can be separate and/or distinct from system 10 so as to be distant from and/or in communication with system 10. In some configurations, first LLM 34 and second LLM 46 can be the same large language model. Alternatively, first LLM 34 and second LLM 46 can be distinct and separate large language models. First LLM 34, second LLM 46, and search engine 38 can have a number of components and/or features not expressly disclosed herein, and can function in conjunction with and/or access the internet. Any of the components/systems shown in FIG. 1 can communicate with each other via any type of wired and wireless communication, including via the use of the internet. In one example, the components/systems shown and described herein can communicate via a publisher/subscriber message bus and/or similar configurations.

FIG. 1 focuses on hardware components of document generation system 10, and is provided as an illustrative example of a general hardware system for performing the capabilities discussed herein. The components presented in FIG. 1, particularly including modules 30, 32, 36, 40, 42, and/or 44 can be omitted or replaced with analogous hardware and/or software in different architectures without departing from the scope and spirit of the present disclosure.

Document generation system 10 (and process 100 described with regards to FIG. 2 and process 200 described with regards to FIG. 3) can include other steps, components, modules, configurations, and/or features not expressly disclosed herein that are suitable for generating documents and/or evaluating documents for hallucinations, among other capabilities. For example, system 10 can include any number of digital/electronic storage media (e.g., storage media 22) for storing data, information, and/or executable instructions. System 10 can include any number of computer processors (e.g., processor 20) for performing tasks/instructions with regards to system 10, process 100, and/or process 200. Further, system 10 can allow for communication via wired or wireless communication methods between components of system 10 and/or between other components, systems, individuals/users, etc. distant from system 10. System 10 is described herein as including one or multiple "modules," which can be any hardware and/or software for performing the tasks, functionality, and/or capabilities described herein. These "modules" can be instantiated in dedicated hardware and/or software, and/or can be defined functionally and use shared hardware and/or software.

Additionally, system 10 can be a discrete assembly or be formed by one or more components capable of individually or collectively implementing the functionalities described herein. In some examples, system 10 can be implemented as a plurality of discrete circuitry subassemblies. In some examples, one or all components of system 10 can include and/or be implemented at least in part on a smartphone or tablet, among other options. In some examples, one or all components of system 10 can include and/or be implemented as downloadable software in the form of a mobile application. The mobile application can be implemented on a computing device, such as a personal computer, tablet, or smartphone, among other suitable devices. One or all components of system 10 can be considered to form a single computing device even when distributed across multiple component computing devices. System 10 can include a configuration in which one, some, or all of the functions described herein are performed by different components. System 10 can include various components for performing the above functions (as well as other functions described in this disclosure), such as processor 20, storage media 22, and/or user interface 24.

Document generation system 10 can access, receive, and/or otherwise use topical information 16. Topical information 16 can be provided to system 10, and/or topical information 16 can be entered/provided by a user via user interface 24 and/or by other means, such as by providing topical information 16 via a website on the internet. The location at which topical information 16 is entered/stored/provided can be in wired and/or wireless communication with document generation system 10. In one example, user interface 24 allows for a user to enter topical information 16 into various dialog boxes. Topical information 16 can be specific to the document 18 that is to be generated by system 10, and can include a project name, a project identification number, a client name, a client industry, a client description, a document type, project challenges, a project duration, project priorities, project special considerations, project service type(s), a delivery type, and/or a delivery location. Topical information 16 can include other information, such as the name/type and number of chunks 28 that are to be generated for document 18 as well as the desired purpose of document 18 and/or of each chunk 28 of document 18. Topical information 16 can be saved in storage media 22 of system 10 and/or at another location. Topical information 16 can also be derived and/or extracted from another document (as opposed to being entered and/or otherwise provided by a user). In one example, topical information 16 is pulled/extracted from correspondence between a user (e.g., a salesperson/company providing products and/or services) and a client (e.g., a company in need of products and/or services).

Document generation system 10 can include and/or work in conjunction with index 12, which in turn can include and/or function in conjunction with any of the other components of system 10 (such as processor 20, storage media 22, and/or user interface 24). Index 12 can be digital storage that provides a location at which specific data/information, such as one or multiple example chunks 14 can be stored. Index 12 can be located within storage media 22 of system 10, located within another storage/memory, and/or stored at a location distant from system 10. In one example, index 12 is located on a local computer/electronic device (e.g., processor, storage/memory, etc.) of one or multiple users. Index 12 can be accessible by one, multiple, or all users to add to, modify, and/or remove data/information (e.g., example chunks 14). Additionally and/or alternatively, index 12 can be accessible/searchable by search engine 38, first LLM 34, and/or second LLM 46 to retrieve relevant example first chunks 14A, example second chunks 14B, and/or example Nth chunks 14C. Index 12 can have any configurations, functionalities, and/or capabilities to store data/information in any format and to allow access and/or modification by other individuals, components, and/or systems. In one example, index 12 stores example chunks 14 in a JSON format to allow for search engine 38 to quickly and easily use topical information 16 to determine the most relevant example chunks 14.

Document generation system 10 can be configured to generate and/or evaluate document 18 having at least one chunk 28 of text. Document 18 can be any grouping of text and/or numbers able to be generated by system 10. However, in the examples described herein, document 18 is an electronic, textual document having at least one chunk 28 of text as generated dependent upon topical information 16. In one example, document 18 is at least a portion of a contract stating the relationship between two parties. In another example, document 18 is a statement of work that defines the goals and obligations of the involved parties (e.g., the product/service provider and the client). Document 18 can have any number of sections, which are known in the industry as "chunks." In the example shown in FIG. 1, document 18 has first chunk 28A, second chunk 28B, and Nth chunk 28C. Document 18 can have any configuration and/or organization, including one or multiple chunks 28 being separated from one another by headings/section titles. The configuration and/or organization of document 18 can be based upon a template, upon example chunks 14, upon input by a user, upon topical information 16, and/or upon other factors/information. Document 18 can be generated and/or outputted in any format, including in a text format (e.g., Word document), a PDF format, and/or another digital and/or physical format. Additionally, document 18 can be outputted to any location within document generation system 10 and/or external to system 10, such as to a location at which topical information 16 is entered and/or to a user. Document 18 is shown in FIG. 1 as having as many chunks 28 as is necessary/desired, represented as Nth chunk 28C. Each of chunks 28 can have any length, format/configuration, orientation, content, purpose, etc. as is necessary/desired for document 18. For example, each of chunks 28 can have a purpose and/or be focused on a project scope, a project summary, an executive summary, client responsibilities, a project description, deliverables, assumptions, a project duration, a service description, party roles, and/or other purposes and/or focuses. Chunks 28 can form all or a portion of document 18, which document 18 being able to accommodate/include other information not generated by system 10 and/or other information not generated by first LLM 34 but otherwise generated/formulated by system 10.

System 10 (and/or the components of system 10) can include one or multiple computer/data processors 20 (also referred to herein as "processor 20"). In general, processor 20 can include any or more than one of a processor, a microprocessor, a controller, a digital signal processor (DSP), an application specific integrated circuit (ASIC), a field-programmable gate array (FPGA), or other equivalent discrete or integrated logic circuitry. Processor 20 can perform instructions stored within storage media 22 (or located elsewhere), and/or processor 20 can include memory such that processor 20 is able to store instructions and perform the functions described herein. Additionally, processor 20 can perform other computing processes described herein, such as the functions performed by any of the components of system 10.

System 10 (and/or the components of system 10) can also include storage media 22. Storage media 22 is configured to store information and, in some examples, can be described as a computer-readable storage medium, media, and/or memory. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage media 22 is a temporary memory. As used herein, a temporary memory refers to a memory having a primary purpose that is not long-term storage. Storage media 22, in some examples, is described as volatile memory. As used herein, a volatile memory refers to a memory that that the memory does not maintain stored contents when power to storage media 22 is turned off. Examples of volatile memories can include random access memories (RAM), dynamic random access memories (DRAM), static random access memories (SRAM), and other forms of volatile memories. In some examples, the storage media/memory is used to store program instructions for execution by the processor. The memory, in one example, is used by software or applications running on system 10 to temporarily store information during program execution.

Storage media 22 can be configured to store larger amounts of information than volatile memory. Storage media 22 can further be configured for long-term storage of information. In some examples, storage media 22 includes non-volatile storage elements. Examples of such non-volatile storage elements can include, for example, magnetic hard discs, optical discs, floppy discs, flash memories, cloud storage media, or forms of electrically programmable memories (EPROM) or electrically erasable and programmable (EEPROM) memories. Additionally, storage media 22 can be digital/electronic storage in the "cloud" that is distant from the other components of project staffing system 10. Storage media 22 can include and/or function in conjunction with data source 38.

System 10 can also include user interface 24. User interface 24 can be an input and/or output device and enables an operator/user to control operation, modification, view of data, index 12, example chunks 14, topical information 16, document 18, chunks 28, and/or the other systems/components within system 10 and/or in communication with system 10. For example, user interface 24 can be configured to receive inputs, such as topical information 16, from a user and/or provide outputs, such as an alert that a chunk 28 includes at least one hallucination. User interface 24 can include one or more of a sound card, a video graphics card, a speaker, a display device (e.g., a liquid crystal display (LCD), a light emitting diode (LED) display, an organic light emitting diode (OLED) display, etc.), a touchscreen, a keyboard, a mouse, a joystick, and/or other type of device for facilitating input and/or output of information in a form understandable to users and/or machines. In one example, a user, operator, and/or other individual can use user interface 24 to view index 12, example chunks 14, topical information 16, queries, requests, document 18, and/or chunks 28.

System 10 can be adjacent to (so as to be contained within one housing, system, etc.) any and/or all of first LLM 34, second LLM 46, and/or search engine 38. Moreover, one component, multiple components, or all of system 10 can be distant from any or all of first LLM 34, second LLM 46, and/or search engine 38. System 10 can communicate with index 12, first LLM 34, second LLM 46, and/or search engine 38 via any type of communication and/or other processes/systems, such as through the use of the internet.

Document generation module 30 of system 10 can include a number of components for formulating document 18 having at least one chunk 28, such as first prompt module 32, first LLM 34, query module 36, search engine 38, and/or assembler module 40. Document generation module 30 can include and/or function in conjunction with any of the other components of system 10 (such as processor 20, storage media 22, and/or user interface 24). Document generation module 30 can be configured to access, receive, and/or otherwise use topical information 16 to generate one or multiple chunks 28 of text for document 18. While document generation module 30 is shown as having a number of components, the components of document generation module 30 can function independently and/or be distinct from document generation module 30. For example, first LLM 34 and search engine 38 may be distinct from document generation module 30 and function in response to requests/queries from document generation module 30 (e.g., from first prompt module 32 and query module 36, respectively).

System 10 can include first prompt module 32, which can include and/or function in conjunction with any of the other components of system 10 (such as processor 20, storage media 22, and/or user interface 24). First prompt module 32 can be configured to create and send requests that include prompts, context, and example chunks 14. All of the information formulated and/or collected by first prompt module 32 (and by second prompt module 44) can be described herein as a "request," which is an inquiry to first LLM 34 or second LLM 46 to perform a task and/or retrieve information. The prompts can each state the desired purpose of the to-be-generated chunks 28. The prompts can each also include instructions and/or tasks for the LLM to perform. The contexts can each provide information that is dependent upon topical information 16. The example chunk(s) 14 are those that were determined by search engine 38 during the search of index 12. First prompt module 32 can formulate, organize, and/or otherwise devise the requests to first LLM 34 such that first LLM 34 performs the desired tasks, returns/retrieves the desired information, etc. in the desired format, configuration, organization, etc. (e.g., first LLM 34 generated one of first chunk 28A, second chunk 28B, and Nth chunk 28C).

The request to first LLM 34 by first prompt module 32 can be a simple request/prompt, which can include only one question/query/inquiry, or can be a complex/compound request/prompt that can include/request a series of separate steps/tasks performed sequentially, concurrently, and/or in another fashion to return desired results. In one example, first prompt module 32 can formulate a request that include multiple (e.g., complex) parts: 1) a prompt states a desired purpose of the to-be-generated chunk 28 as well as other background and useful information; 2) a context that provide information dependent upon topical information 16; and 3) at least one example chunk 14. In this example, the prompt can be a description of what is being requested/asked of the first LLM 34 and can include such items as the format the outputted chunk 28 should be in, the language in which chunk 28 should be in, and/or other information. The request can also include any explanations regarding the provided example chunk(s) 14 as well as any explanations regarding the topical information 16 upon which the to-be-generated chunk 28 is dependent. The information dependent upon topical information 16 as provided in the context of the request (as formulated by first prompt module 32 and/or second prompt module 44) can be any information that is based on, derived from, and/or includes topical information 16 that may be useful to LLMs 34 and/or 46 in generating chunks 28 and/or evaluating chunks 28, respectively. In one example, the information provided in the context dependent upon topical information 16 includes some or all of topical information 16 as accessed, received, and/or otherwise used by system 10, process 100, and/or process 200.

First prompt module 34 can include and/or work in conjunction with storage media 22 to access, receive, and/or otherwise use information from topical information 16 and/or index 12, and can include and/or work in conjunction with processor 20 to perform tasks/instructions to formulate a request. Additionally and/or alternatively, user interface 24 can allow a user to formulate, edit, delete, and/or otherwise modify the request to first LLM 34 to generate one or multiple chunks 28. Further, as described with regards to FIG. 3, first prompt module 34 can include the configuration, functionality, and/or capabilities to determine the order in which multiple chunks 28 should be generated when chunks 28A-28C of document 18 are interdependent upon one another. Second prompt module 44 of document evaluation module 42 can have the same or similar functionalities, configurations, and/or capabilities as first prompt module 32. In one example, first prompt module 32 and second prompt module 44 are the same component that is capable of formulating requests to both first LLM 34 and second LLM 46. Second prompt module 44 is described in greater detail below with regards to document evaluation module 42 and second LLM 46. Before formulating a request to first LLM 34, query module 36 may need to formulate a query to search engine 38, and search engine 38 may need to search index 12 to determine the most relevant example chunk(s) 14 with regards to the to-be-generated chunk 28. This is described in further detail below.

System 10 can include and/or work in conjunction with, receive information from, and/or provide information to first LLM 34 and to second LLM 46. While the example in FIG. 1 shows first LLM 34 and second LLM 46 as being separate and distinct components/systems from one another, first LLM 34 and second LLM 46 can be the same large language model. Additionally, while the example in FIG. 1 shows first LLM 34 and second LLM 46 as being components within (e.g., part of) document generation system 10, first LLM 34 and/or second LLM 46 can be separate and distinct from system 10 (i.e., at a location distant from system 10) and communicate with system 10 via wired or wireless communication.

LLMs 34 and 46 and similar models are increasingly common deep learning algorithms that can recognize, summarize, translate, and/or generate content using large datasets, which can include information available and/or accessed on the internet. LLMs 34 and 46 can be used to process simple or complex requests which, for example, demand retrieval of data from multiple or specialized sources, assemble outputs (e.g., natural language, computer code, lists) from the retrieved data based on identified criteria, and/or further process of those outputs (e.g., transmission or archival to specified categories or locations and/or recipients). LLMs 34 and 46 can include generalized LLMs, specialized LLMs, and/or other models. LLM 14 can be a model and/or other system known to one of skill in the industry for retrieving, organizing, summarizing, manipulating, and/or performing other functions with regards to information in response to one or multiple requests from first prompt module 32 and/or second prompt module 44. LLMs 34 and 46 can be configured to communicate with (e.g., provide information to and receive information from) any of the components of system 10 and/or other components, such as index 12, document generation module 30, document evaluation module 42, search engine 38, assembler module 40, and/or the internet. The specific use of first LLM 34 and second LLM 46 with system 10 is described in detail below with regards to, for example, process 100 and/or process 200.

The information/results determined by first LLM 34 and/or second LLM 46 can be communicated/provided to any of the components of system 10 and/or other components/systems distinct from system 10 (e.g., chunks 28 and/or the full document 18 can be communicated/provided to a user at a location distant from system 10, such as the user's email inbox, a computer terminal, etc.). Chunks 28 can be communicated/provided in real time as each chunk 28 is generated. In another example, system 10 can wait to provide chunks 28 until all chunks 28 are generated and assembled/compiled into one complete document 18 (e.g., compiled by assembler module 40 as described below).

First prompt module 32 and/or other components of document generation system 10 can receive and/or work in conjunction with query module 36 and/or search engine 38. Query module 36 can include and/or work in conjunction with storage media 22 to access, receive, and/or otherwise use information based on topical information 16 and/or other information, and can include and/or work in conjunction with processor 20 to perform tasks/instructions to formulate a query/request. Additionally and/or alternatively, user interface 24 can allow a user to formulate, edit, delete, and/or otherwise modify the query/request to search engine 38 to determine one or more example chunks 14. Query module 36 can be configured to formulate a query to search engine 38 asking search engine 38 to examine/search index 12 and determine at least one (but potentially more) relevant example chunks 14. The example chunks 14 are dependent upon topical information 16 and potentially upon the desired purpose of the to-be-generated chunk 28A-28C. In the example shown in FIG. 1, example first chunks 14A correspond to (e.g., are the results of a search depending upon topical information 16 and the desired purpose of) the to-be-generated first chunk 28A, example second chunks 14B correspond to the to-be-generated second chunk 28B, and example third chunks correspond to the to-be-generated third chunk 28C.

Query module 36 can access, receive, and/or otherwise use topical information 16 and/or other information, such as a desired purpose of the to-be-generated chunk 28. Query module 36 can then formulate a query/request to search engine 38 based on that information. The query can convert the information contained in the query/request into any format suitable for use by search engine 38 in determining relevant example chunks 14. In one example, the information is converted into one or multiple vector embeddings that are more easily used as inputs to search engine 38. Vector embeddings can be a way to convert words, sentences/phrases, and/or other information/data into numbers that capture relationships. Thus, search engine 38 can use the vector embeddings provided by query module 36 to find similarities between the information in the query/request and example chunks 14 in index 12. The formulation of queries/request by query module 36 can be performed automatically and/or concurrently with respect to multiple to-be-generated chunks 28 (e.g., multiple queries can be formulated concurrently for each to-be-generated chunk 28 to ask search engine 38 to determine example chunks 14 corresponding to the to-be-generated chunks 28). The automatic formulation of a query/request by query module 36 can be performed in response to the reception of topical information 16 and/or the determination/selection of the type of document 18 to be generated (and thus the determination/selection of how many, which kind, and purposes of chunks 28).

Further, system 10 can work in conjunction with, receive information from, and/or provide information to search engine 38. Search engine 38 can be any software system(s) that identifies results/information in databases/datasets (such as index 12) in response to one or multiple queries/requests. Search engine 38 can be configured to perform any type of search, such as a similarity search, to determine relevant example chunk(s) 14 dependent upon topical information 16. For example, a similarity search can use cosine similarity and/or be a vector search. The databases/datasets can be, for example, available and/or accessed on the internet. Additionally, as described below, search engine 38 can include and/or have access to index 12, which may include multiple example chunks 14 and/or other information useful to the generation of chunks 28. For example, prior documents 18 can be included in index 12. Search engine 38 can be configured to provide search results (e.g., data, information) as prompted by any type of query, such as a navigational, informational, transaction, and/or investigational query. Additionally, the query can be in the form of a semantic and/or similarity search. Search engine 38 can be any system, model, and/or process known to one of skill in the industry for providing results/information in response to one or multiple queries/requests. Search engine 38 can be configured to communicate with (e.g., provide information to and receive information from) any components of system 10, including first prompt module 32, first LLM 34, second prompt module 44, second LLM 46, and/or other components of system 10 and/or distinct from system 10.

System 10 can include assembler module 40, which can include, communicate with, and/or function in conjunction with any of the other components of system 10 (such as processor 20, storage media 22, and/or user interface 24). Assembler module 40 can be configured to access, receive, and/or otherwise use newly generated chunk(s) 28 to assemble/compile multiple chunk(s) 28 into one continuous document 18. Assembler module 40 can use a template and/or other information to determine how and in which order to assemble/compile the multiple chunks 28 into one document 18 that is organized, coherent, easy to understand, and consistent with other documents of similar type (e.g., if document 18 is a SOW, then assembler module 40 can assemble and/or organize chunks 28 in a manner that is consistent with other SOWs). Assembler module 40 can receive chunks 28 from first LLM 34 after each chunk 28 is generated, and assembler module 40 can store the chunks 28 at any location, including in storage media 22, until all chunks 28 have been generated. Additionally and/or alternatively, assembler module 40 can function in conjunction with user interface 24 to allow a user to formulate, edit, delete, and/or otherwise modify the configuration, organization, etc. of chunks 28 and/or document 18. Assembler module 40 can perform other alternations and/or inclusions to document 18, such as providing headings and/or other information within document 18 to improve readability and/or understanding.

System 10 can also include, work in conjunction with, and/or otherwise use and/or communicate with document evaluation module 42. Document evaluation module 42 can include second prompt module 44 and/or second LLM 46 configured to evaluate one or each chunk 28 as generated by first LLM 34 for one or multiple hallucinations. Those of skill in the industry are aware that information generated by a large language model can include hallucinations that are data/information that is not factually correct and/or that is not responsive and/or relevant to the request/query/prompt. Inclusion of these hallucinations in chunks 28 and/or document 18 can be problematic, so document evaluation module 42 is configured to identify hallucinations in chunks 28 and/or document 18.

Document evaluation module 42 can include second prompt module 44, which can include and/or function in conjunction with any of the other components of system 10 (such as processor 20, storage media 22, and/or user interface 24). Second prompt module 44 can have the same or similar configurations, capabilities, and/or functionalities as first prompt module 32 described above. Additionally, first prompt module 32 and second prompt module 44 can be the same module such that one component/module has all of the capabilities and performs all of the tasks described herein with regards to first prompt module 32 and second prompt module 44. However, second prompt module 44 is configured to formulate and send requests that include prompts (that ask second LLM 46 to review the newly generated chunks 28 for hallucinations) and contexts (that provides the generated chunk(s) 28 and topical information 16). Each request can be in regards to one newly generated chunk 28, or each request can include multiple chunks 28 and the request can ask second LLM 46 to evaluate all provided chunks 28 for hallucinations. The request to second LLM 46 as formulated and/or communicated by second prompt module 44 can have any format, can include any number of requests/prompts (e.g., simple and/or complex), and can include other information not expressly described above. Because the request to second LLM 46 can include one or multiple chunks 28 as generated by first LLM 34, second prompt module 44 can be in communication with first LLM 34 and/or other components of system 10 to access, receive, and/or otherwise use newly chunks 28 and/or document 18.

As described above, system 10 can include (and second prompt module 44 can be in communication with) second LLM 46. Second LLM 46 can have the same or similar configurations, capabilities, and/or functionalities as first LLM 34 described above. In one example, first LLM 34 and second LLM 46 are the same large language model. In another example, second LLM 46 is trained and/or fine-tuned for the evaluation of chunks 28 for hallucinations, thereby potentially being specialized for evaluations as compared to first LLM 34. Thus, in some configurations, it may be advantageous for second LLM 46 to be a separate and distinct large language model from first LLM 34 because the evaluation by second LLM 46 of chunks 28 for hallucinations as generated by first LLM 34 may be more accurate than the evaluation by first LLM 34. The evaluation by second LLM 46 may be performed individually on each chunk 28 after each chunk 28 is generated by first LLM 46, and thus before that chunk 28 is used in generating subsequent chunks 28 that are dependent upon that newly generated chunk 28. Alternatively, the evaluation can be performed after all chunks 28 in document 18 have been generated by first LLM 34. In one example, the generation of chunks 28 and the evaluation of those chunks 28 are performed concurrently (e.g., first chunk 28A is evaluated by second LLM 46 for hallucinations while second chunk 28B is being generated by first LLM 34). In another example, the evaluation of chunks 28 for hallucinations can be performed by first LLM 34, and first LLM 34 may include additional training and/or fine-tuning to better evaluate chunks 28 for hallucinations. Further, the evaluation by first LLM 34 and/or second LLM 46 for hallucinations may be improved by refining the prompt provided to first LLM 34 and/or second LLM 46 asking the LLM to evaluate the chunk(s) 28 for hallucinations.

System 10, and particularly document evaluation module 42 (including second prompt module 44 and/or second LLM 46) can be configured to perform various actions in response to second LLM 46 determining that one or multiple chunks 28 include one or multiple hallucinations. In one example, system 10 can discard/delete the chunk 28 that is determined to include one or multiple hallucinations. In another example, system 10 can save the chunk 28 that is determined to include one or multiple hallucinations. The saved chunk 28 may be used for training and/or fine-tuning of first LLM 34 and/or second LLM 46, further evaluation, and/or other purposes, for example. In a third example, system 10 can initiate an alert stating/exclaiming that chunk 28 includes at least one hallucination. The alert, for example, can be a visual and/or audio alarm that notifies a user that a hallucination was found, such as via user interface 24. System 10 can include other configurations, capabilities, and/or functionalities not expressly disclosed herein. The process for generating chunks 28, assembling those chunks 28 into one continuous document 18, and evaluating those chunks 28 and/or the document 18 for hallucinations is described in process 100 shown in FIG. 2.

Figure 2:
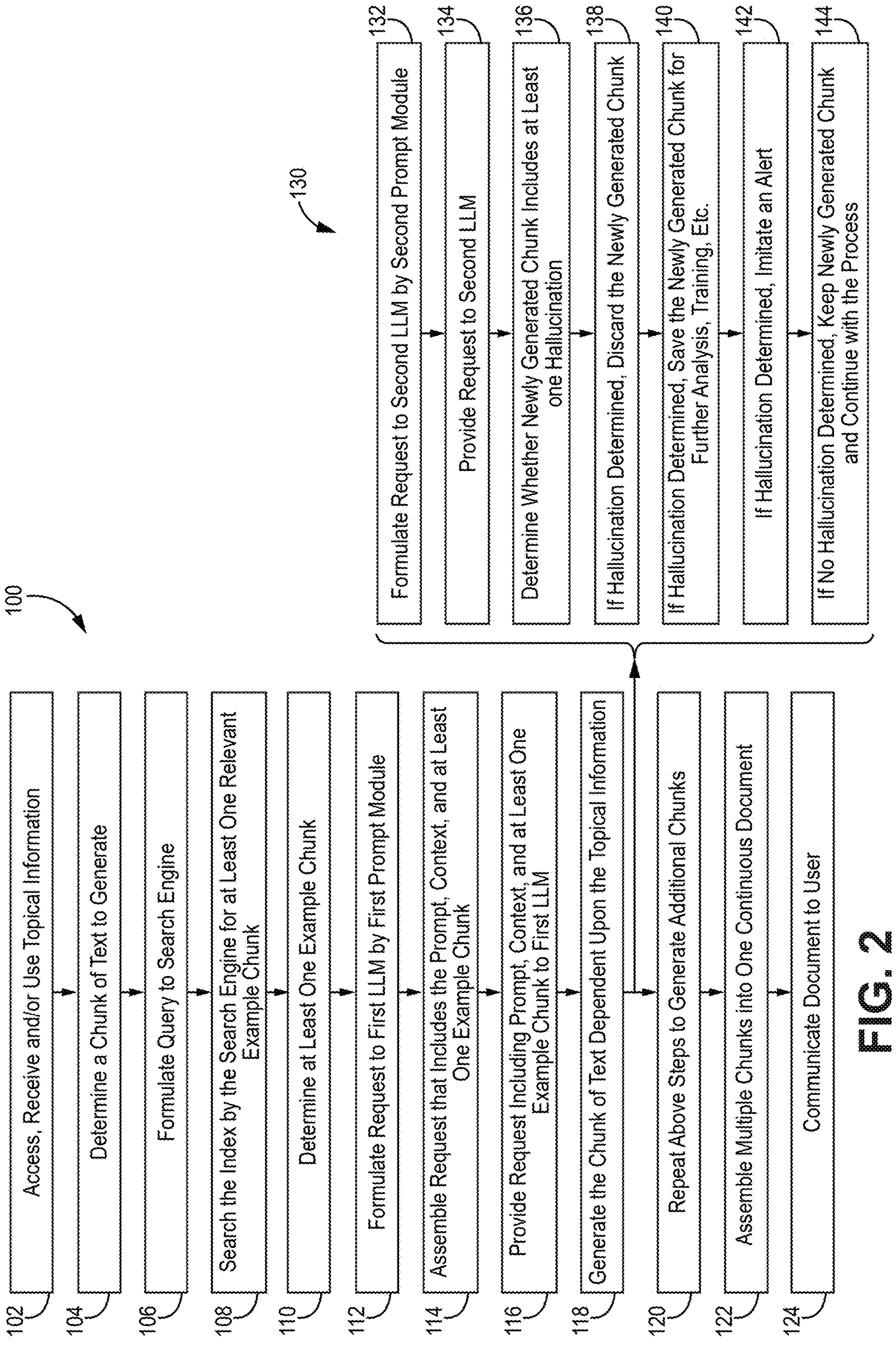
FIG. 2 is a method flow chart describing an example process for generating a document having multiple chunks of text and evaluating those chunks for hallucinations.

FIG. 2 is a method flow chart describing an example process 100 for generating document 18 having multiple chunks 28 of text and/or evaluating those chunks 28 for hallucinations.

While process 100 is described herein as being used with regards to document generation system 10, process 100 can be performed by any system having any components, capabilities, configurations, and/or functionalities suitable for performing process 100. Additionally, process 100 can include other steps not expressly disclosed herein and/or can include performing the disclosed steps in any order and/or multiple times as is desired and/or necessary to generate one or multiple chunks 28 of text for document 18 and/or evaluate those chunks 28 of text for hallucinations. Moreover, not all steps of process 100 must be performed, and process 100 can be performed partially and/or entirely in a digital environment by and/or within the systems/components set out in FIG. 1, such as document generation system 10 and/or other systems/components.

Process 100 can include step 102, which is to access, receive, and/or otherwise collect/use topical information 16. Step 102 can include providing topical information 16 to system 10 by various means, and/or by entering topical information 16 by a user via user interface 24. In one example, step 102 includes entering topical information 16 via a website on the internet and/or on a software program, which then automatically provides topical information 16 to system 10. In another example, step 102 includes a user entering topical information 16 in a dialog box provided by user interface 24 of system 10. Step 102 can include saving topical information 16, such as by saving topical information 16 in storage media 22. As described above, topical information 16 as collected in step 102 can include a project name, a project identification number, a client name, a client industry, a client description, a document type, project challenges, a project duration, project priorities, project special considerations, project service type(s), a delivery type, a delivery location, the name/type of to-be-generated chunks 28, the number of chunks 28 to be generated, the purpose and/or desired content of document 18 and/or chunks 28, and/or other information. Step 102 can include extracting and/or otherwise deriving topical information 16 from another document (i.e., collecting topical information 16 from another document (as opposed to being entered and/or otherwise provided by a user). In one example, step 102 includes pulling/extracting topical information 16 from correspondence between a user (e.g., a salesperson/company providing products and/or services) and a client (e.g., a company in need of products and/or services).

Process 100 can include step 104, which is determining the chunk 28 of text to generate. If chunks 28A-28C are interdependent upon one another, than step 104 can include further sub-steps as described with regards to process 200 shown in FIG. 3. Step 104 can be performed by one or multiple components of system 10 and/or by computer processor 20. Step 104 can be performed by referring to a template, document, list, instructions, tables, graphs, and/or other information that details the order in which chunks 28 should be generated. This information can be dependent upon topical information 16 and/or the type of document 18 to be generated. Further, step 104 can include determining the chunk 28 to generate by reviewing example chunks 28 and/or example documents 18, by using a template of document 18, by using information specifying the order in topical information 16, by using machine learning and/or any other type of algorithms and/or artificial intelligence, and/or by various other methods and/or tools. In one example, step 104 determines the chunk 28 of text to generate first by referring to a configuration file that sets out the order in which chunks 28 should be generated for that particular type of document 18. In this example, document 18 can be a SOW and the configuration file can set out the order to generate chunks 28A-28C as follows: generate chunk 28A with a desired purpose of project scope, then generate chunk 28B for project duration, and then generate chunks 28C thereafter for assumptions, client responsibilities, deliverables, service description, and party roles. Step 104 can be performed once before generating multiple chunks 28, or step 104 can be performed before each chunk 28 is generated, even if multiple chunks 28 are being generated for one document 18.

Step 106 can include formulating a query to search engine 38. Step 106 can include using topical information 16 (and potentially other information, such as a desired purpose of the to-be-generated chunk 28 and/or document 18) to formulate a query to search engine 38 instructing search engine 38 to search/examine index 12 for example chunk(s) 14 relevant to topical information 16 and the to-be-generated chunk 28. Step 106 can be performed by query module 36 and/or by any component of system 10. Additionally and/or alternatively, step 106 can include allowing a user, via user interface 24, to formulate, edit, delete, and/or otherwise modify the query to search engine 38 to determine one or more relevant example chunks 14. Step 106 can be performed automatically in response to the collection of topical information 16 and/or instructions for system 10 to generate chunk(s) 28, and/or step 106 can be performed as initiated by a user. In one example, a user initiates system 10 to begin process 100 and one, multiple, or all steps of process 100 are performed automatically concurrently and/or in series in response. The query can be any type, such as a navigational, informational, transaction, and/or investigational query. Step 106 can include converting the information contained in the query into any format suitable for use by search engine 38 in determining relevant example chunks 14. For example, step 106 can include converting the information into one or multiple vector embeddings that are used as inputs to search engine 38 to find similarities between the information in the query and example chunk(s) 14 in index 12. As with step 104 above, step 106 can be performed automatically and/or concurrently with respect to multiple chunks 28 (e.g., multiple queries can be formulated concurrently for each chunk 28 that is to be generated to instruct search engine 38 to determine relevant example chunks 14 corresponding to each of the to-be-generated chunks 28).

Process 100 can then include step 108, which is to search index 12 by search engine 38 for at least one relevant example chunk 14, and step 110, which is to determine/select the at least one example chunk 14. Steps 108 and 110 can be initiated by query module 32 and/or other components providing a query to search engine 38. Steps 108 and/or 110 can be performed by search engine 38 and/or by any software system(s), models, and/or processes known to one of skill in the industry that search and identify results/information (e.g., relevant example chunks 14) in index 12, extracts the relevant example chunks 14, and/or sends those relevant example chunks 14 to the proper components of system 10 (and/or saves those relevant example chunks 14). Step 108 can include any type of search, such as a similarity search that uses cosine similarity and/or vector searching. In one example, step 108 includes using vector embeddings to search index 12 containing example chunks 14, and step 110 includes determining/selecting the most relevant example chunks 14 having the greatest similarity with respect to the vector embeddings in the query. In another example, step 110 uses information provided in step 106 (e.g., the information in the query/request that is dependent upon topical information 16 and/or the type of chunk that is to be generated) to compare the information to example chunks 14 to determine one or multiple relevant example chunks 14. Steps 110 can include determining/selecting the single most relevant example chunk 14, or step 110 can include determining/selecting multiple relevant example chunks 14 (e.g., selecting the top three example chunks 14). Step 110 can also include saving and/or otherwise communicating the determined/selected example chunk(s) 14 to any component of system 10, such as first prompt module 32 and/or first LLM 34.

Concurrent with and/or after the previous steps have determined/selected example chunk(s) 14, step 112 can be performed by formulating the request to first LLM 34 by first prompt module 32 and/or by other components of system 10. Along with step 112, process 100 can have step 114, which is to assemble the request (i.e., the information included in the request) that includes the prompt that can state the desired purpose of the to-be-generated chunk 28, the context that provides information dependent upon topical information 16, and the at least one example chunk 14. Step 112 can include formulating/determining the contents of the request as well as organizing and/or otherwise devising the request to first LLM 34 so that first LLM 34 performs the desired tasks, returns/retrieves the desired information, etc. in the desired format, configuration, organization, etc. (e.g., first LLM 34 generates one of first chunk 28A, second chunk 28B, and Nth chunk 28C). As described above with regards to first prompt module 34 and second prompt module 44, the request as formulated in step 112 and assembled in step 114 can be a simple request or a complex/compound request that can include/require a series of separate steps/tasks performed sequentially, concurrently, and/or in another fashion to return desired results (e.g., to return chunk 28 accomplishing the desired purpose). The request as formulated in step 112 can include other information, such as any explanations regarding the provided example chunk(s) 14 as well as any explanations regarding the information dependent upon topical information 16.

Step 112 and/or step 114 can be performed by and/or in conjunction with storage media 22 to access, receive, and/or otherwise use information dependent upon topical information 16, index 12 (e.g., example chunks 14), and/or other information saved in storage media 22. Additionally, the request as assembled in step 114 can be saved in storage media 22 before step 116 (providing the request to first LLM 34). Steps 112 and 114 can be similar to step 132 of sub-process 130, except for the content of the request formulated in step 134 may be different than the content of the request formulated and assembled in steps 112 and 114, respectively. The formulation of the prompt in step 112 having the desired purpose of the to-be-generated chunk 28 can be performed automatically dependent upon the topical information 16, the type of chunk 28 to be generated (as determined by step 104), and/or other information (such as template information of document 18). For example, step 104 can determine that chunk 28 to be generated is to be the project scope. Step 112 can include automatically formulated the prompt that has the desired purpose of chunk 28 (e.g., drafting text regarding the project scope and text stating specifically what the project scope will include/entail based on topical information 16). In other examples, the to-be-generated chunk 28 can have a different desired purpose dependent upon the same or different portions of topical information 16. The assembly of the request in step 114 can be such that all information in the request is compiled into a single body of text that is provided to first LLM 34 simultaneously (i.e., at one time), or the request can be assembled in multiple sections (e.g., divided into the prompt, context, and example chunks 14) and provided to first LLM 34 in step 116 in portions (as opposed to the entirety of the request being provided at one time).

Process 100 can include step 116, which is providing the request that includes the prompt, the context, and the example chunks 14 to first LLM 34. As described above, the request can be provided to first LLM 34 at one time, or sections/portions of the request can be provided to first LLM 34 separately (e.g., the prompt, context, and example chunks 14 can be provided to first LLM 34 at different times/instances). Step 116 can be performed by any component of system 10, including by first prompt module 32. With first LLM 34 able to be integrated/part of system 10 or distant from system 10, providing the request to first LLM 34 in step 116 can be performed via wired and/or wireless communication. Providing the request to first LLM 34 can be performed by entering the request into a dialog and/or text box associated with first LLM 34 and/or by other methods. Step 112 (formulating request), step 114 (assembling request), and step 116 (providing request to first LLM 34) may collectively be described and/or referred to as “prompting” first LLM 34 to generate the chunk 28.

After first LLM 34 accesses, receives, and/or otherwise uses the request that includes the prompt, the context, and the example chunk(s) 14, process 100 can include step 118. Step 118 can include generating chunk 28 of text dependent upon topical information 16 and, potentially, among other information. Step 118 can be performed via various methods and/or with aid from, for example, the internet and/or other sources. Step 118 can include generating chunk 28 that includes one or multiple textual sentences, paragraphs, etc. that accomplish the desired purpose as set out in the prompt of the request. Additionally, while chunk 28 is described herein as being a chunk of text, chunk 28 as generated in step 118 can include other information, such as algorithms, numbers, software code, graphs, tables, etc. having any arrangement, configuration, and/or orientation useful to a user and/or software program. Once generated, step 118 can include communicating and/or otherwise allowing access to the newly generated chunk 28 by the other components of system 10. In one example, the newly generated chunk 28 is communicated from first LLM 34 to storage media 22 and/or assembler module 40. Additionally, step 118 can include formulating, modifying, deleting all or portion of, and/or otherwise altering the newly generated chunk 28 depending on the desired and/or actual purpose of chunk 28, topical information 16, and/or other factors. Such alternations can be performed during step 118 (e.g., after each chunk 28 is generated) and/or after all generated chunks 18 are assembled to form documents 18.

After each chunk 28 is generated in step 118, process 100 can include step 120, which is to repeat one, multiple, and/or all of steps 102 through 118 until all chunks 28 of document 18 are generated. As described above, one, multiple, or all of steps 102 through 118 can be performed each time a new chunk 28 is to be generated. In one example, steps 102 and 104 are performed only once at the beginning of process 100 and steps 106 through 118 are performed each time a new chunk 28 is to be generated. The repeating of one, multiple, or all of steps 102 through 118 as set out in step 120 can be performed automatically dependent upon the number and/or types of chunks 28 to be generated. For example, the repeating of steps in process 100 to generate additional chunk(s) 28 can be initiated automatically upon completing the generation of a chunk 28 and/or when a newly chunk 28 is received from first LLM 34. In another configuration, step 120 (i.e., the repeating of the steps to generate another chunk 28) can be initiated by a user and/or by other means after a new chunk 28 is generated.

After one or all chunks 28 have been generated via process 100, process 100 can further include step 122, which is assembling the multiple newly generated chunks 28 into one all-encompassing document 18. Step 122 can be performed by any component(s) of system 10 (and/or by other capable systems), such as assembler module 40. In other configurations of process 100, step 122 does not need to be performed. Instead, each newly generated chunk 28 (or if only one chunk 28 is generated by process 100) can be communicated individually to a user or to another location after the performance of step 118. Step 122 can include the use of a template and/or other information to determine how and in which order to assemble/compile the chunks 28 into one document 18 that is organized, coherent, easy to understand, and consistent with other documents of similar type. Additionally, step 122 can include formulating, modifying, deleting, and/or otherwise altering all or portions of chunks 28 and/or other information in document 18. In one example, step 122 can include adding headings and/or other information before, within, and/or after one or multiple chunks 28.

Process 100 can also include step 124, which is communicating one or multiple chunks 28 and/or a portion or all of document 18 to a user and/or to another endpoint, such as a computer terminal, email address, storage media 22, another storage media distinct from system 10, and/or another location within or distant from system 10. Step 124 can be performed by various communication methods, such as via wired and/or wireless communication. Additionally, step 124 can be performed automatically after each chunk 28 is generated and/or after document 18 is assembled, or step 124 can be performed manually as initiated by a user and/or by another input.

Process 100 can also include sub-process 130, which is an evaluation of one, multiple, or all newly generated chunk(s) 28 for at least one hallucination as generated by first LLM 34 and/or via another method/system. Sub-process 130 can be performed any time after the generation of a chunk, such as after step 118 (e.g., after each time step 118 is performed to generate a new chunk 28), after step 122 (i.e., after chunks 28 have been assembled in document 18), and/or at other times. Sub-process 130, like process 100, can be performed by any system having any components, capabilities, configurations, and/or functionalities suitable for performing sub-process 130. Additionally, process 100 can include configurations in which sub-process 130 is not performed, and sub-process 130 may be performed without performing one, multiple, or all of the other steps of process 100. Moreover, not all steps of sub-process 130 must be performed, and sub-process 130 can be performed partially and/or entirely in a digital environment by and/or within the systems/components set out in FIG. 1, such as document generation system 10 having document evaluation module 42.

Sub-process 130 can include step 132, which includes formulating a request to second LLM 46 by second prompt module 44 and/or by other components of system 10 (such as first prompt module 34 as described above). Step 132 can include assembling the request (similar to step 114 with regards to the generation of chunks 28). Step 132 can include the same and/or similar processes, capabilities, and/or configurations as steps 112 and 114, except that step 132 is focused on formulating a request instructing second LLM 46 to review/evaluate the chunk 28 for one or multiple hallucinations. The request formulated in step 132 can include a prompt that instructs second LLM 46 to review chunk 28 for one or multiple hallucinations and a context that provides the newly generated chunk 28, topical information 16, and/or information dependent upon topical information 16 to second LLM 46. Step 132 can include formulating/determining the contents of the request as well as organizing and/or otherwise devising the request to second LLM 46 so that second LLM 46 performs the desired tasks, returns/retrieves the desired information, etc. in the desired format, configuration, organization, etc. (e.g., second LLM 46 review chunks 28 for hallucinations). As described above with regards to first prompt module 32 and second prompt module 44, the request as formulated and assembled in step 132 can be a simple request or a complex/compound request that can include/require a series of separate steps/tasks performed sequentially, concurrently, and/or in another fashion to return desired results (e.g., to return a determination of whether the provided chunk(s) 28 include at least one hallucination). The request as formulated in step 132 can include other information, such as the desired purpose of chunk 28, any explanations regarding the provided chunk(s) 28, as well as any explanations regarding topical information 16 and/or the information dependent upon topical information 16.

Step 132 can be performed by and/or in conjunction with storage media 22 to access, receive, and/or otherwise use topical information 16 and/or information dependent upon topical information 16, newly generated chunk(s) 28, and/or other information saved in storage media 22. Additionally, the request as assembled in step 132 can be saved in storage media 22 before step 134 (i.e. before providing the request to second LLM 34). The formulation of the prompt in step 132 instructing second LLM 46 to determine whether chunk(s) 28 have any hallucinations can be performed automatically after one, multiple, or all chunks 28 are generated and/or based upon other information/factors. Step 132 can include automatically formulating the prompt that has the instructions to evaluate chunk 28 for hallucinations as well as automatically accessing, receiving, and/or otherwise using chunk 28 and topical information 16 (and/or information dependent upon topical information 16). In one example, the prompt includes a textual description asking second LLM 46 to review the provided chunk 28 for hallucinations. In another example, the prompt includes other information, such as explanations regarding the chunk 28 and/or topical information 16 (and/or information dependent upon topical information 16). The assembly of the request in step 132 can be such that all information in the request is compiled into a single body of text and/or other information that is provided to second LLM 46 in step 134 simultaneously (i.e., at one time), or the request can be assembled in multiple sections (e.g., the prompt and the context) and provided to second LLM 46 in step 134 in portions (as opposed to the entirety of the request being provided at one time). In another configuration, step 132 can be performed by first prompt module 32 such that all requests are formulated by one component/processor.

Sub-process 130 can further includes step 134, which can be providing the request having the prompt and the context to second LLM 46. Step 134 of sub-process 130 can be similar to step 116, except that the request as formulated by second prompt module 44 is provided to second LLM 46. In another configuration, step 134 includes providing the request instead to first LLM 34, and first LLM 34 is instructed to review the chunk(s) 28 for hallucinations. As described above, the request can be provided to second LLM 46 at one time, or in sections/portions of the request can be provided to second LLM 46 separated (e.g., the prompt and the context can be provided at different times/instances). Step 134 can be performed by any component of system 10 and/or with the aid of any component, including second prompt module 44. With second LLM 46 being within system 10 or distant from system 10, providing the request to second LLM 46 in step 134 can be performed via wired and/or wireless communication. Providing the request to second LLM 46 can be performed by entering the request into a dialog and/or text box associated with second LLM 46 and/or by other methods.

After second LLM 46 accesses, receives, and/or otherwise uses the request that includes the prompt and context, sub-process 130 can include step 136. Step 136 can include determining whether newly generated chunk(s) 28 include at least one hallucination. Step 136 can be performed via various methods and/or with aid from, for example, the internet and/or other sources. Step 136 can include outputting a conclusion as to the determination of whether the provided, newly generated chunk(s) include a hallucination in a variety of formats, including a yes/no answer, a value, table, graph, etc. representing the likelihood that each provided chunk 28 includes a hallucination (e.g., a probability that a hallucination is present), an annotated/highlighted recitation of the chunk(s) 28 noting which portions are determined to be hallucinations, and/or other information. The output can have any arrangement, configuration, and/or orientation useful to a user and/or software program. Once the evaluation is complete, step 136 can include communicating and/or otherwise allowing access to the determination (e.g., the conclusion of the evaluation) by the other components of system 10. In one example, the determination is communicated to storage media 22, a component that can initiate an alert, a user, a computer software program, and/or another location.

Sub-process 130 can include a number of optional steps 138, 140, and 142 that can be performed if step 136 determines that chunk 28 includes at least one hallucination and/or if step 136 determines that there is a high probability (e.g., a probability above a specific threshold) that chunk 28 includes at least one hallucination. If step 136 returns a determination that no hallucination exists in chunk 28 and/or if step 136 does not return a determination (e.g., the determination is inconclusive), steps 138, 140, and/or 142 may not be performed.

Step 138 can include, if a hallucination is determined, discarding/deleting the newly generated chunk 28 and potentially repeating some or all of the steps of process 100 to generate a new chunk 28 with the same desired purpose. Step 138 can be performed by any component of system 10, and the discarding of chunk 28 can be the temporary or permanent deletion of chunk 28 via electronic/digital and/or other means. Step 138 can be performed manually by a user in response to a determination that chunk 28 includes a hallucination, and/or step 138 can be performed automatically in response to the determination and/or in response to other events. If no hallucination is found, step 138 may not be performed and chunk 28 can be communicated to a user and/or be assembled into document 18 (e.g., step 144 can be performed).

Step 140 can include, if a hallucination is determined, saving the newly generated chunk for further analysis, training, etc. Step 140 can be performed by any of the components of system 10, including by storage media 22. The saving of chunk 28 in step 140 can be performed automatically in response to the determination and/or in response to other events. If no hallucination is found, step 140 may not be performed and chunk 28 can be communicated to a user and/or be assembled into document 18 (e.g., step 144 can be performed).

Step 142 can include, if a hallucination is determined, initiating an alert that notifies a user of such determination. Step 142 can be performed by any of the components of system 10 and/or by a component that is not expressly disclosed herein. The initiating of the alert and the alert itself can include sending a textual notification to a user, providing and audio and/or visual alert/notice, and/or any other type of alert to draw attention to the determination in step 138 that chunk 28 includes at least one hallucination and/or that chunk 28 has a high probably of including a hallucination (if the determination includes merely a value representative of a probably that a hallucination is present in chunk 28, and that value is above a threshold to set off step 142). As with steps 138 and 140, step 142 can be performed manually and/or automatically in response to a determination that chunk 28 includes a hallucination, and if no hallucination is found, step 142 may not be performed and instead step 144 may be performed. In one example, the initiating of the alert and/or the alert is performed via user interface 24.

Step 144 can include keeping newly generated chunk 28 and continuing with process 100 if no hallucination is determined, if the determination is inconclusive, and/or if the determination reveals a low probability that chunk 28 includes a hallucination. Thus, if step 144 is performed, process 100 can continue by assembling the evaluated chunk 28 (with other chunks 28 that were evaluated and determined to be hallucination-free) into document 18 and/or providing and/or otherwise communicating chunk 28 to a user and/or to another location.

Process 100 can include other steps not expressly disclosed herein and/or not shown in FIG. 2. For example, process 100 can include a step that includes training first LLM 34, second LLM 46, and/or search engine 38. The training of these elements/components can be by using previous requests as formulated by first prompt module 32 and/or second prompt module 44, queries as formulated by query module 36, example chunks 14 as found in index 12, and/or chunks 28 that were previously generated in prior performances of process 100. The training of machine-learning models, search engines, large language models, etc. is known to one of skill in the industry. Other configurations of process 100 can include not performing training, performing the training before the performance of the other steps in process 100, and/or performing the training only once while the other steps of process 100 are performed multiple times to generate different chunks 28, evaluate different chunks 28, etc. Additionally, the training can be performed periodically as new training data/information is formulated and/or can be performed dependent upon the accuracy/efficiency of first LLM 34, second LLM 46, and/or search engine 38 (e.g., when the results are less than desired, the training can be initiated at any time).

Figure 3:
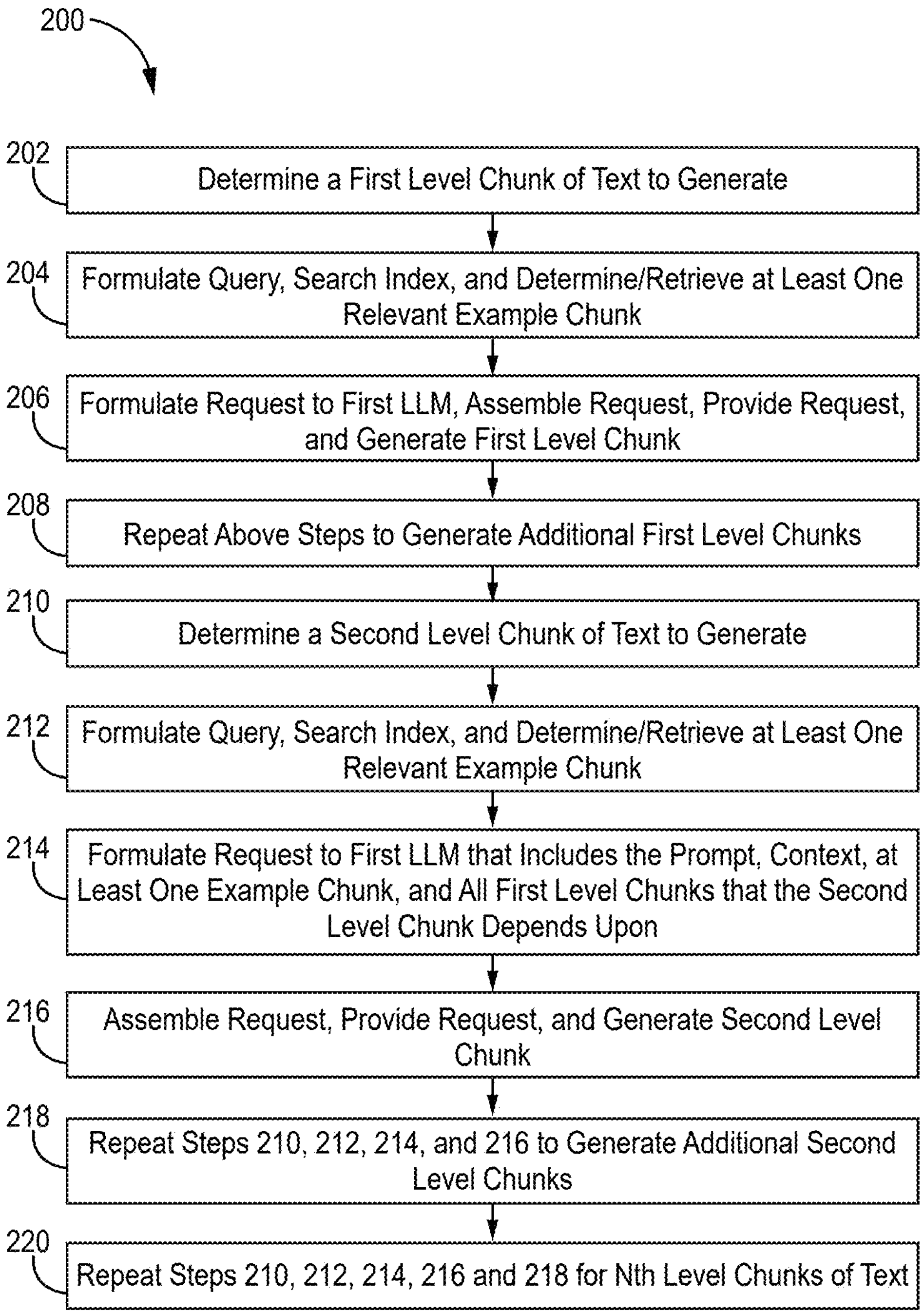
FIG. 3 is a method flow chart describing an example process for generating multiple chunks of text interdependent upon one another.

FIG. 3 is a method flow chart describing example process 200 for determining an order/sequence to generate multiple chunks 28 of text interdependent upon one another. As with process 100 (and sub-process 130), process 200 can be performed by any system having any components, capabilities, configurations, and/or functionalities suitable for performing process 200, including document generation system

10. Additionally, process 200 can include other steps not expressly disclosed herein and/or can include performing the disclosed steps in any order and/or multiple times as is desired and/or necessary to generate one or multiple chunks 28 of text that are interdependent upon one another. Moreover, not all steps of process 200 must be performed, and process 200 can be performed partially and/or entirely in a digital environment by and/or within the systems/components set out in FIG. 1, such as document generation system 10 and/or other systems/components. In some example configurations, one, multiple, or all of the steps of process 200 can be integrated into process 100 such that the steps of process 200 can be performed concurrently and/or in series with one, multiple, or all of the steps of process 100. For example, process 200 can include collecting topical information 16 (step 102) at the beginning of process 200. In another example, process 200 can include sub-process 130 performed once or multiple times throughout process 200, such as after each chunk 28 is generated. In a third example, process 200 can include assembling multiple chunks 28 into document 18 (step 122) and/or communicating those chunk (s) 28 and/or document 18 to a user and/or another location (step 124).

Process 200 can include step 202, which is determining a first level chunk 28 of text to generate. The first level chunks 28 are those chunks of text that do not depend upon any other to-be-generated chunks 28 and instead depend upon topical information 16, at least one example chunk 14, the desired purpose of chunk 28 as set out in the context of the request to first LLM 34, and/or other information. In one example, a first level chunk 28 has a desired purpose that is the scope of the project. In this example, the scope of the project does not depend from other to-be-generated chunks 28 having other desired purposes. Determining which chunks 28 are first level chunks 28 can be performed by referring to a template, document, instructions, tables, graphs, and/or other information that state/show which chunks 28 are not dependent from other to-be-generated chunks (e.g., are independent from other chunks). This information can be formulated before the beginning of process 200 and/or during process 200, and the information can be generated automatically by system 10 by reviewing example and/or template documents 18 that are of a similar type to the document 18 to be generated by process 200. In another configuration, this information (e.g., the order in which chunks 28 are generated/the level that each chunk 28 is in and the dependencies of chunks 28) can be formulated by a user. The information can be saved at any location, including in storage media 22 and can be referenced and/or used by system 10 to perform step 202.

After determining the first level chunk 28 to generate, process 200 can include step 204, which is to formulate a query (by, for example, query module 36), search index 12 (by, for example, search engine 38), and determine/retrieve at least one relevant example chunk 14 (by, for example, search engine 38). Step 204 is similar to steps 106, 108, and 110 as described in process 100 shown in FIG. 2. Review this description with regards to steps 106, 108, and 110 for further details of the functionalities, capabilities, configurations, and/or other information of step 204.

After determining at least one relevant example chunk 14, process 200 can include step 206, which is to formulate a request (by, for example, first prompt module 32), assemble the request (by, for example, first prompt module 32), provide the request to first LLM 34, and generate first level chunk 28 (by, for example, first LLM 34). Step 206 is similar to steps 112, 114, 116, and 118 as described in process 100 shown in FIG. 2. Review this description with regards to steps 112, 114, 116, and 118 for further details of the functionalities, capabilities, configurations, and/or other information of step 206.

Next, process 200 can include step 208, which is to repeat the above steps 202-206 to generate all first level chunks 28. Step 208 can be repeated as many times as is necessary to generate all of the first level chunks 28 that do not depend upon any other generated and/or to-be-generated chunks 28. For example, if document 18 is to includes eight chunks 28 that do not depend from other to-be-generated chunks 28, then step 208 (repeating the generation of one first level chunk) is performed seven times, for a total generation of eight first level chunks 28. For each time step 208 is performed, relevant example chunk(s) 14 can be determined/retrieved from index 12 depending on topical information 16, the desired purpose of the particular to-be-generated chunk 28, and/or other information relevant to the particular to-be-generated chunk 28.

After one, multiple, or all first level chunks 28 have been generated via steps 202-208, process 200 can includes step 210. Step 210 is determining a second level chunk 28 of text to generate. Step 210 can be performed after all first level chunks 28 upon which the to-be-generated second level chunk 28 depends are already generated. Thus, process 200 can include performing step 210 before every first level chunk 28 is generated (e.g., the steps of process 200 do not need to be performed in the order shown in FIG. 3 and described herein, and step 210 can be performed before step 208). Step 210 can be performed after the one or multiple first level chunks 28 that the second level chunk 28 depends from have been generated. Step 210 can be performed similarly to step 202, except that second level chunks 28 depend from newly generated first level chunks 28 as opposed to depending only from topical information 16, the example chunks 28, and/or the desired purpose of the to-be-generated chunk 28. For example, first level chunk 28, which has already been generated by process 200, can be focused on the scope of the project. Second level chunk 28 can be focused on the project assumptions, which depends upon (e.g., includes information from and/or information that is derived from) the scope of the project. The determination of which chunks 28 are second level chunks can be performed similarly to that in step 202, such as by referring to a template, document, instructions, tables, graphs, and/or other information that state/show which chunks 28 are dependent from first level chunks. This information can be formulated before the beginning of process 200 and/or during process 200, and can be formulated automatically and/or manually.

A second level chunk is a chunk that depends only from one or multiple first level chunks (with first level chunks being independent (i.e., not depending from any other chunks)). As described below with regards to step 220, a third level chunk is a chunk that depends from at least one second level chunk, which in turn depends from at least one first level chunk. Thus, a third level chunk requires at least two chunks to be generated before the third level chunk is generated. A third level chunk can also have a configuration in which it depends from both at least one second level chunk and at least one first level chunk. Process 200 can be configured to allow for the generation of chunks 28 having any level of dependency (e.g., described herein as an "Nth" level chunk).

After determining a second level chunk 28 to generate, process 200 can include step 212, which is to formulate a query (by, for example, query module 36), search index 12

(by, for example, search engine 38), and determine/retrieve at least one relevant example chunk 14 (by, for example, search engine 38). Step 212 is similar to step 204 of process 200 and steps 106, 108, and 110 as described in process 100 shown in FIG. 2. Review this description with regards to steps 106, 108, and 110 for further details of the functionalities, capabilities, configurations, and/or other information of step 212.

Process 200 can include step 214, which is formulating the request to first LLM 34 by, for example, first prompt module 32 and/or by other components of system 10. The request as formulated in step 214 can include a prompt (states the desired purpose of the to-be-generated second level chunk 28), a context (provides topical information 16 and/or information dependent upon topical information 16), the at least one relevant example chunk 14, and the first level chunk(s) 28 upon which the to-be-generated second level chunk 28 depends. Aside from including the already-generated first level chunk(s) 28, the request as formulated in step 214 can be similar to the requests formulated in step 112 of process 100 and/or step 206 of process 200. Thus, review this description with regards to step 112 of process 100 and step 206 of process 200 for further details of the functionalities, capabilities, configurations, and/or other information of step 214.

Along with step 214, process 200 can include step 216, which is to assemble the request (by, for example, first prompt module 32), provide the request to first LLM 34 (which includes at least one first level chunk 28 from which the to-be-generated second level chunk 28 depends), and generate second level chunk 28 (by, for example, first LLM 34). Step 214 is similar to step 206 of process 200 and steps 114, 116, and 118 of process 100 as shown in FIG. 2. Review this description with regards to step 206 of process 200 and steps 114, 116, and 118 for further details of the functionalities, capabilities, configurations, and/or other information of step 216.

Process 200 can then include step 218, which is repeating one, multiple, or all of steps 210, 212, 214, and 216 to generate additional second level chunks 28 that depend from at least one first level chunk 28. Step 218 can be similar to step 208 described above, except that the request includes the newly generated first level chunk(s) 28 and the chunks 28 that are generated are second level chunks 28. Step 218 can be repeated as many times as is necessary to generate all of the second level chunks 28 that depend from already-generated first level chunks 28. For example, if document 18 is to include eight chunks 28 that are first level chunks (do not depend from other chunks 28) and four chunks 28 that are second level chunks (depend from at least one first level chunk 28), then step 218 (repeating the generation of one second level chunk) is performed three times, for a total generation of four second level chunks 28. For each time step 218 is performed, relevant example chunk(s) 14 can be determined/retrieved from index 12 depending on topical information 16, the desired purpose of the particular to-be-generated second level chunk 28 can be formulated, and/or other information relevant to the particular to-be-generated second level chunk 28 can be included in the corresponding request.

Finally, process 200 can include step 220, which is repeating steps 210, 212, 214, 216, and/or 218 for the remaining levels of chunks 28 (e.g., for Nth level chunks 28). Step 220 can be repeated for as many levels of chunks 28 as is necessary to generate all chunks 28 to complete document 18. The request as formulated in step 220 can include any number of already-generated chunks 28 having any level based on the Nth level chunk 28 that is to be generated and the dependencies thereby.

Process 200 can include sub-process 130 to evaluate each newly generated chunk 28 for hallucinations. It may be advantageous to evaluate each newly generated chunk 28 soon after being generated and before that newly generated chunk 28 is used in generating another, subsequent chunk 28 that depends from that newly generated chunk 28. The evaluation of the newly generated chunk 28 before being used in generating other chunks 28 may prevent or reduce the likelihood that those subsequent chunks 28 include information derived from a hallucination in the newly generated chunk 28. Additionally and/or alternatively, chunks 28 can be evaluated for hallucinations after all chunks 28 have been generated via process 200.

The following are nonlimiting examples of the above disclosure:

A method of generating a document having multiple chunks of text that collectively form at least a portion of the document is disclosed herein that can include determining a first chunk of the multiple chunks of text to generate dependent upon topical information relevant to the document that is to be created and retrieving, from an index, at least one example first chunk of text with the at least one example first chunk of text being dependent upon a desired purpose of the first chunk and upon the topical information. The method can further include generating the first chunk of text by a first large language model via a first request that includes a prompt that states the desired purpose of the first chunk of text to be generated, a context that provides first information dependent upon the topical information, and the at least one example first chunk of text. The method can also include determining a second chunk of the multiple chunks of text to generate dependent upon the topical information and retrieving, from the index, at least one example second chunk of text with the at least one example second chunk of text being dependent upon a desired purpose of the second chunk and upon the topical information. Additional steps can include generating the second chunk of text by the first large language model via a second request that includes a prompt that states the desired purpose of the second chunk of text to be generated, a context that provides second information dependent upon the topical information, the at least one example second chunk of text, and the first chunk of text with the second chunk of text being dependent upon the first chunk of text previously generated by the first large language model and assembling the first chunk of text and the second chunk of text to form at least a portion of the document such that the first chunk and the second chunk are consistent in content.

The method can further include that the topical information includes at least one of the following: a project name, a project identification number, a client name, a client industry, a client description, a document type, at least one challenge of the project, a project duration, at least one priority of the project, at least one special consideration, at least one service type, a delivery type, and a delivery location.

The method can further include that the document is a contract.

The method can further include that the contract is a statement of work.

The method can further include that the statement of work is for development of a software program for a client.

The method can further include that the desired purpose of the first chunk for the statement of work is at least one of the following: a project scope, a project summary, an executive summary, client responsibilities, a project description, deliverables, assumptions, a project duration, a service description, and party roles.

The method can further include determining a third chunk of the multiple chunks of text to generate dependent upon the topical information; retrieving, form the index, at least one example third chunk of text with the at least one example third chunk of text being dependent upon a desired purpose of the third chunk; and generating the third chunk of text by the large language module via a third request that includes a prompt that states the desired purpose of the third chunk of text to be generated, a context that provide third information dependent upon the topical information, the at least one example third chunk of text, the first chunk of text, and the second chunk of text with the third chunk of text being dependent upon the first chunk of text and the second chunk of text previously generated by the large language model.

The method can further include adding the third chunk of text to the document that includes the first chunk of text and the second chunk of text.

The method can further include evaluating the first chunk of text for a hallucination as generated by the first large language model.

The method can further include that the evaluation of the first chunk of text is performed before the generation of the second chunk of text.

The method can further include evaluating the second chunk of text for a hallucination as generated by the first large language model.

The method can further include that the evaluation of the first chunk and the evaluation of the second chunk are performed concurrently.

The method can further include that the evaluation is performed by a second large language model that is different from the first large language model.

The method can further include that the steps of determining the first chunk of text to generate and determining the second chunk of text to generate is performed by a computer processor.

The method can further include that the computer processor determines the first chunk of text to generate and the second chunk of text to generate based on instructions dependent on the document that is to be generated.

The method can further include that the retrieval of the at least one example first chunk of text from the index further includes formulating a query that depends upon the desired purpose of the first chunk of text to be generated and upon the topical information, providing the query to a search engine in communication with the index, and determining the at least one example first chunk of text from multiple example chunks of text in the index.

The method can further include that the query is formulated by a query module in communication with the search engine.

The method can further include that the assembly of the first chunk of text and the second chunk of text to form at least a portion of the document is performed by an assembler module.

The method can further include that the document is saved in a storage media.

The method can further include communicating the document having the first chunk of text and the second chunk of text to a user.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of generating a document having multiple chunks of text that collectively form at least a portion of the document, the method comprising:

determining a first chunk of the multiple chunks of text to generate dependent upon topical information relevant to the document that is to be created;

retrieving, from an index, at least one example first chunk of text with the at least one example first chunk of text being dependent upon a desired purpose of the first chunk and upon the topical information;

generating the first chunk of text by a first large language model via a first request that includes a prompt that states the desired purpose of the first chunk of text to be generated, a context that provides first information dependent upon the topical information, and the at least one example first chunk of text;

determining a second chunk of the multiple chunks of text to generate dependent upon the topical information;

retrieving, from the index, at least one example second chunk of text with the at least one example second chunk of text being dependent upon a desired purpose of the second chunk and upon the topical information;

generating the second chunk of text by the first large language model via a second request that includes a prompt that states the desired purpose of the second chunk of text to be generated, a context that provides second information dependent upon the topical information, the at least one example second chunk of text, and the first chunk of text with the second chunk of text being dependent upon the first chunk of text previously generated by the first large language model; and assembling the first chunk of text and the second chunk of text to form at least a portion of the document such that the first chunk and the second chunk are consistent in content.

2. The method of claim 1, wherein the topical information includes at least one of the following: a project name, a project identification number, a client name, a client industry, a client description, a document type, at least one challenge of the project, a project duration, at least one priority of the project, at least one special consideration, at least one service type, a delivery type, and a delivery location.

3. The method of claim 1, wherein the document is a contract.

4. The method of claim 3, wherein the contract is a statement of work.

5. The method of claim 4, wherein the statement of work is for development of a software program for a client.

6. The method of claim 5, wherein the desired purpose of the first chunk for the statement of work is at least one of the following: a project scope, a project summary, an executive summary, client responsibilities, a project description, deliverables, assumptions, a project duration, a service description, and party roles.

7. The method of claim 1, further comprising:

determining a third chunk of the multiple chunks of text to generate dependent upon the topical information;

retrieving, form the index, at least one example third chunk of text with the at least one example third chunk of text being dependent upon a desired purpose of the third chunk; and generating the third chunk of text by the large language model via a third request that includes a prompt that states the desired purpose of the third chunk of text to be generated, a context that provide third information dependent upon the topical information, the at least one example third chunk of text, the first chunk of text, and the second chunk of text with the third chunk of text being dependent upon the first chunk of text and the second chunk of text previously generated by the large language model.

8. The method of claim 7, further comprising:

adding the third chunk of text to the document that includes the first chunk of text and the second chunk of text.

9. The method of claim 1, further comprising:

evaluating the first chunk of text for a hallucination as generated by the first large language model.

10. The method of claim 9, wherein the evaluation of the first chunk of text is performed before the generation of the second chunk of text.

11. The method of claim 9, further comprising:

evaluating the second chunk of text for a hallucination as generated by the first large language model.

12. The method of claim 11, wherein the evaluation of the first chunk and the evaluation of the second chunk are performed concurrently.

13. The method of claim 9, wherein the evaluation is performed by a second large language model that is different from the first large language model.

14. The method of claim 1, wherein the steps of determining the first chunk of text to generate and determining the second chunk of text to generate is performed by a computer processor.

15. The method of claim 14, wherein the computer processor determines the first chunk of text to generate and the second chunk of text to generate based on instructions dependent on the document that is to be generated.

16. The method of claim 1, wherein the retrieval of the at least one example first chunk of text from the index further comprises:

formulating a query that depends upon the desired purpose of the first chunk of text to be generated and upon the topical information;

providing the query to a search engine in communication with the index; and determining the at least one example first chunk of text from multiple example chunks of text in the index.

17. The method of claim 16, wherein the query is formulated by a query module in communication with the search engine.

18. The method of claim 1, wherein the assembly of the first chunk of text and the second chunk of text to form at least a portion of the document is performed by an assembler module.

19. The method of claim 1, wherein the document is saved in a storage media.

20. The method of claim 1, further comprising:

communicating the document having the first chunk of text and the second chunk of text to a user.

* * * * *